United States Patent
Bailey, Jr. et al.

(10) Patent No.: US 8,533,219 B2
(45) Date of Patent: Sep. 10, 2013

(54) ADJUSTING ONE OR MORE TRACE FILTERS IN A DATABASE SYSTEM

(75) Inventors: George E. Bailey, Jr., Houston, TX (US); Kurt V. Goolsbee, Spring, TX (US); Everett T. Miskelly, Houston, TX (US)

(73) Assignee: BBS Technologies, Inc., Houston, TX (US)

( * ) Notice: Subject to any disclaimer, the term of this patent is extended or adjusted under 35 U.S.C. 154(b) by 0 days.

(21) Appl. No.: 13/225,219

(22) Filed: Sep. 2, 2011

(65) Prior Publication Data

US 2013/0060730 A1 Mar. 7, 2013

(51) Int. Cl.
*G06F 17/30* (2006.01)

(52) U.S. Cl.
USPC .......................................... 707/769; 709/224

(58) Field of Classification Search
USPC .......................................... 707/769; 709/224
See application file for complete search history.

(56) References Cited

U.S. PATENT DOCUMENTS

| | | | | |
|---|---|---|---|---|
| 7,031,953 | B2 * | 4/2006 | Shah et al. | 707/769 |
| 7,509,414 | B2 * | 3/2009 | Agarwal et al. | 709/224 |
| 7,617,313 | B1 * | 11/2009 | Washburn et al. | 709/224 |
| 7,685,092 | B2 * | 3/2010 | Reichert et al. | 707/999.001 |
| 7,752,301 | B1 * | 7/2010 | Maiocco et al. | 709/224 |
| 7,779,119 | B2 * | 8/2010 | Ginter et al. | 709/224 |
| 7,783,743 | B1 * | 8/2010 | Brown | 709/224 |
| 7,822,844 | B2 * | 10/2010 | Oulu et al. | 709/224 |
| 7,953,887 | B2 * | 5/2011 | Boss et al. | 709/238 |
| 2012/0079098 | A1 * | 3/2012 | Moehler et al. | 709/224 |

* cited by examiner

*Primary Examiner* — Kim Nguyen
(74) *Attorney, Agent, or Firm* — Park, Vaughan, Fleming & Dowler, LLP; Laxman Sahasrabuddhe

(57) ABSTRACT

Methods and systems for adjusting trace filters in a database system are described. During operation, an embodiment may receive, from a user, an indication of a performance problem. Next, the embodiment may determine settings of one or more trace filters based on the indication of the performance problem. The embodiment may then collect trace data based on the one or more trace filters. While the trace data is being collected, the embodiment may perform the following set of operations one or more times: (1) obtain database system performance metrics, (2) analyze the trace data to obtain an analysis result, and (3) adjust the settings of the one or more trace filters based on the database system performance metrics and the analysis result.

18 Claims, 2 Drawing Sheets

ADJUSTING ONE OR MORE TRACE FILTERS IN A DATABASE SYSTEM

BACKGROUND

1. Technical Field

This disclosure relates to databases. More specifically, this disclosure relates to adjusting one or more trace filters in a database system.

2. Related Art

Database systems are used for many mission critical applications in modern enterprises. The size and complexity of databases has grown exponentially over the past several years. It is not uncommon for an enterprise to use terabyte- or petabyte-sized databases.

Given the size and complexity of modern databases, and the fact that they are commonly used in mission critical applications, it is not surprising that database performance is often an important issue. One approach to solve performance problems involves collecting trace data from the database system, and then tweaking the database system based on an analysis of the trace data. Unfortunately, the act of collecting trace data can itself create performance problems.

SUMMARY

Some embodiments described herein provide methods and systems for adjusting trace filters in a database system. During operation, an embodiment may receive, from a user, an indication of a performance problem. Next, the embodiment may determine settings of one or more trace filters based on the indication of the performance problem. The embodiment may then collect trace data based on the one or more trace filters.

While the trace data is being collected, the embodiment may perform the following set of operations: (1) obtain database system performance metrics, (2) analyze the trace data to obtain an analysis result, and (3) adjust the settings of the one or more trace filters based on the database system performance metrics and the analysis result. Adjusting the settings of the one or more trace filters can include modifying a threshold value associated with a trace filter in the one or more trace filters. Some embodiments may adjust the trace filter settings only once, while other embodiments may continually (e.g., periodically) adjust the trace filter settings. In embodiments that continually adjust the trace filter settings, the set of operations may be executed iteratively in a loop that terminates when a sufficient amount of data has been collected and/or a predetermined amount of time has elapsed.

The database system performance metrics can indicate a performance impact of the trace data collection process. Specifically, in some embodiments, the database system performance metrics can include one or more of: an amount of processor time used by a procedure, batch, or query; memory usage of the database system; an amount of disk operations performed while processing a procedure, batch, or query; and an amount of bytes or packets processed by a network interface.

The analysis result can indicate that: the trace data is insufficient to determine recommendations for solving the performance problem; the trace data is expected to cause performance problems when the trace data is used to determine recommendations for solving the performance problem; or the trace data is sufficient to determine recommendations for solving the performance problem, and is not expected to cause performance problems when the trace data is used to determine recommendations for solving the performance problem.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
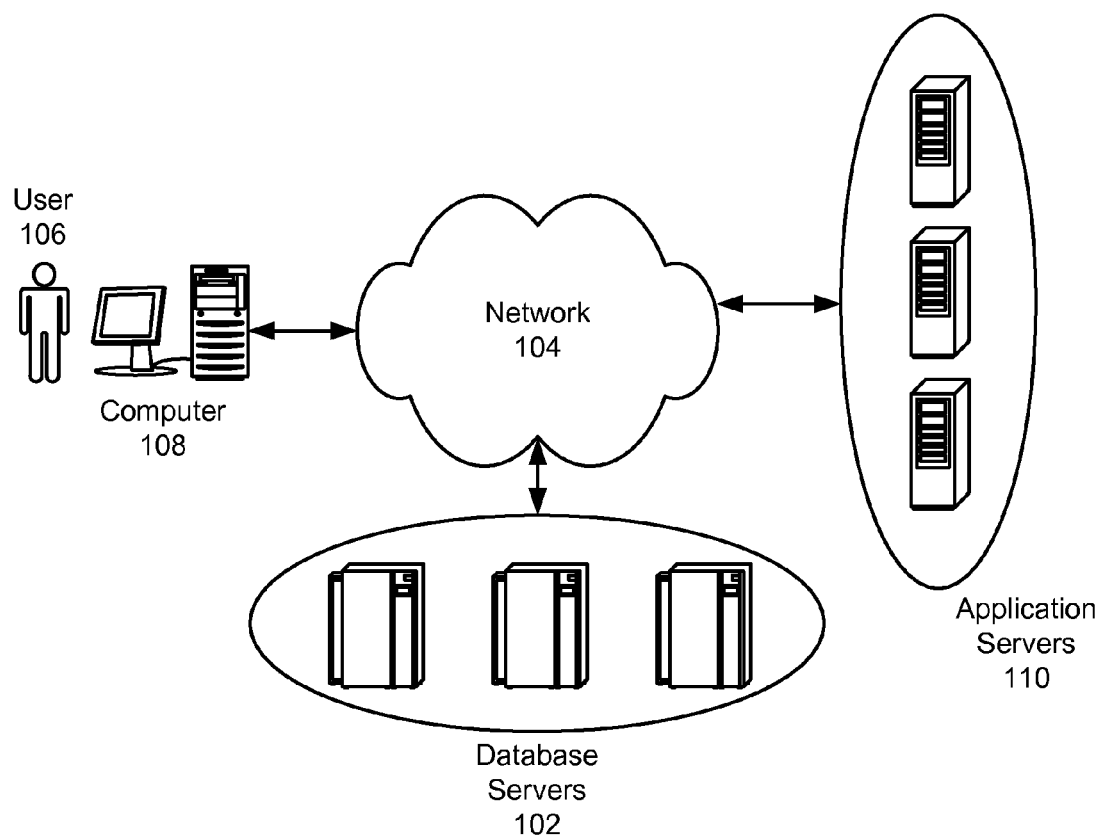
FIG. 1 illustrates a system in accordance with some embodiments described herein.

FIG. 1 illustrates a system in accordance with some embodiments described herein. The system shown in FIG. 1 includes a set of application servers 110, a set of database servers 102, user 106 at computer 108, and network 104. Computer 108, application servers 110, and database servers 102 can communicate with one another via network 104.

Network 104 can generally include any type of wired or wireless communication channel capable of coupling together computing nodes. This includes, but is not limited to, a local area network, a wide area network, or a combination of networks. In some configurations application servers 110 and database servers 102 can be located on the same physical device.

Database servers 102 can store data using a variety of data storage systems. This includes, but is not limited to, systems based upon magnetic, optical, and magneto-optical storage devices, as well as storage devices based on flash memory and/or battery-backed up memory.

User 106 can be a database administrator (DBA) who is responsible for the operation and maintenance of database servers 102, and typically has the privilege to modify data stored in the storage system.

According to one definition, (1) a database is an organized collection of data; (2) a database server is a computer program that executes on a computer system, and which provides access to one or more databases based on a client-server model; and (3) a database system comprises, among other things, one or more databases, one or more database servers, and one or more computer systems on which the one or more database servers execute.

Figure 2:
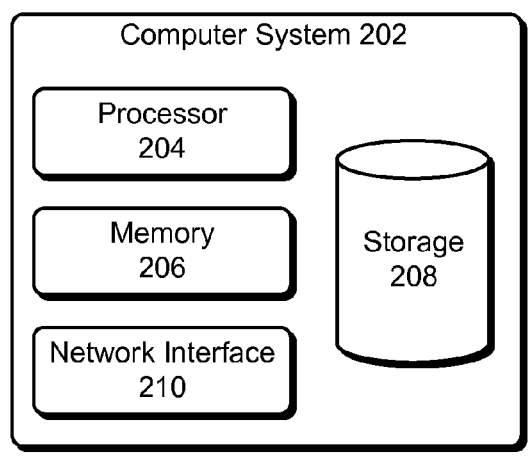
FIG. 2 illustrates a computer system in accordance with some embodiments described herein.

FIG. 2 illustrates a computer system in accordance with some embodiments described herein.

A computer system can generally be any mechanism that is capable of performing computations. Computer system 202 can include processor 204, memory 206, storage 208 (e.g., flash or disk), and network interface 210. Computer system 202 can execute one or more instances of a database server. Computer system 202 can include hardware and/or software instrumentation to measure various hardware and/or database performance metrics. For example, computer system 202 may include hardware and/or software instrumentation to measure the amount of time (e.g., number of clock cycles) used on a processor, the amount of memory being used, the number of I/O requests that are performed on storage 208, the amount of data read and/or written to storage 208, and the number of packets and/or bytes received and/or sent via network interface 210. Specifically, in some embodiments, the operating system (OS) can keep track of the processor time (e.g., by using a hardware clock), memory usage (e.g., by using the OS memory management component), I/O requests (e.g., by using the OS disk access and/or file system components), and network traffic (e.g., by using the OS networking stack and/or counters in the networking interface).

The performance measurement instrumentation can be used to obtain performance metrics for a given software entity. For example, computer system 202 can determine the amount of processor time that was used and/or the number of I/O requests that were performed while processing a procedure, batch, or database query. A procedure (also known as a "stored procedure") refers to a sequence of database operations that is executed when the procedure is invoked. Procedures can be used to consolidate and centralize logic that was replicated in multiple applications. A batch is a collection of database operations that are executed as a group. Some databases support features that allow a batch to be executed more efficiently than executing its constituent operations individually. A database query is an operation that enables data that satisfies certain criteria to be retrieved from the database. For example, a database query can be performed using the "SELECT" statement in SQL (Structured Query Language).

The above examples of performance metrics (e.g., processor time, memory usage, I/O requests, etc.) and software entities (e.g., procedure, batch, database query) are for illustration purposes only, and are not intended to limit the scope of this disclosure to the forms disclosed.

A trace refers to a hardware and/or software mechanism that enables the database system to collect execution and/or performance data for a software entity. Collecting every bit of trace data is usually impractical. Therefore, database systems typically support trace filters that can be used to limit the amount of trace data that is collected and/or stored for further analysis. A trace filter can generally include any set of rules and/or thresholds to limit the amount of trace data that is collected and/or stored for further analysis. For example, a trace filter may state that trace data should only be collected for those software entities (e.g., procedures, batches, and/or database queries) that take up more processor time than a given threshold. The trace filter may additionally specify that trace data is only to be collected for a given group of software entities. These examples of trace filters have been provided for illustration purposes only. In general, a trace filter can specify an arbitrarily complex set of criteria to enable the system to collect and/or store only a subset of trace data from the universe of available trace data.

Once the trace data has been collected, it can be analyzed to determine recommendations to improve performance. The software application or module that performs the analysis can be co-located with the database server or reside on a different computer system. For example, the trace data that is collected on one or more database servers 102 shown in FIG. 1 can be sent to computer 108. An application executing on computer 108 can, with or without user intervention, analyze the trace data and provide recommendations to improve performance and/or solve database performance issues.

Determining what settings to use for the trace filters can be very challenging. Specifically, if the trace filters do not filter enough data, the amount of data collected can easily overwhelm the computer. On the other hand, if too little data is collected, then the amount of data may not be sufficient to perform an analysis for determining recommendations. Some embodiments described herein determine an initial setting for one or more trace filters based on performance problems that are identified by a user, and then adjust the trace filters on an ongoing basis depending on the amount and/or type of trace data that is collected and the impact the collection process has on the system's performance.

Figure 3:
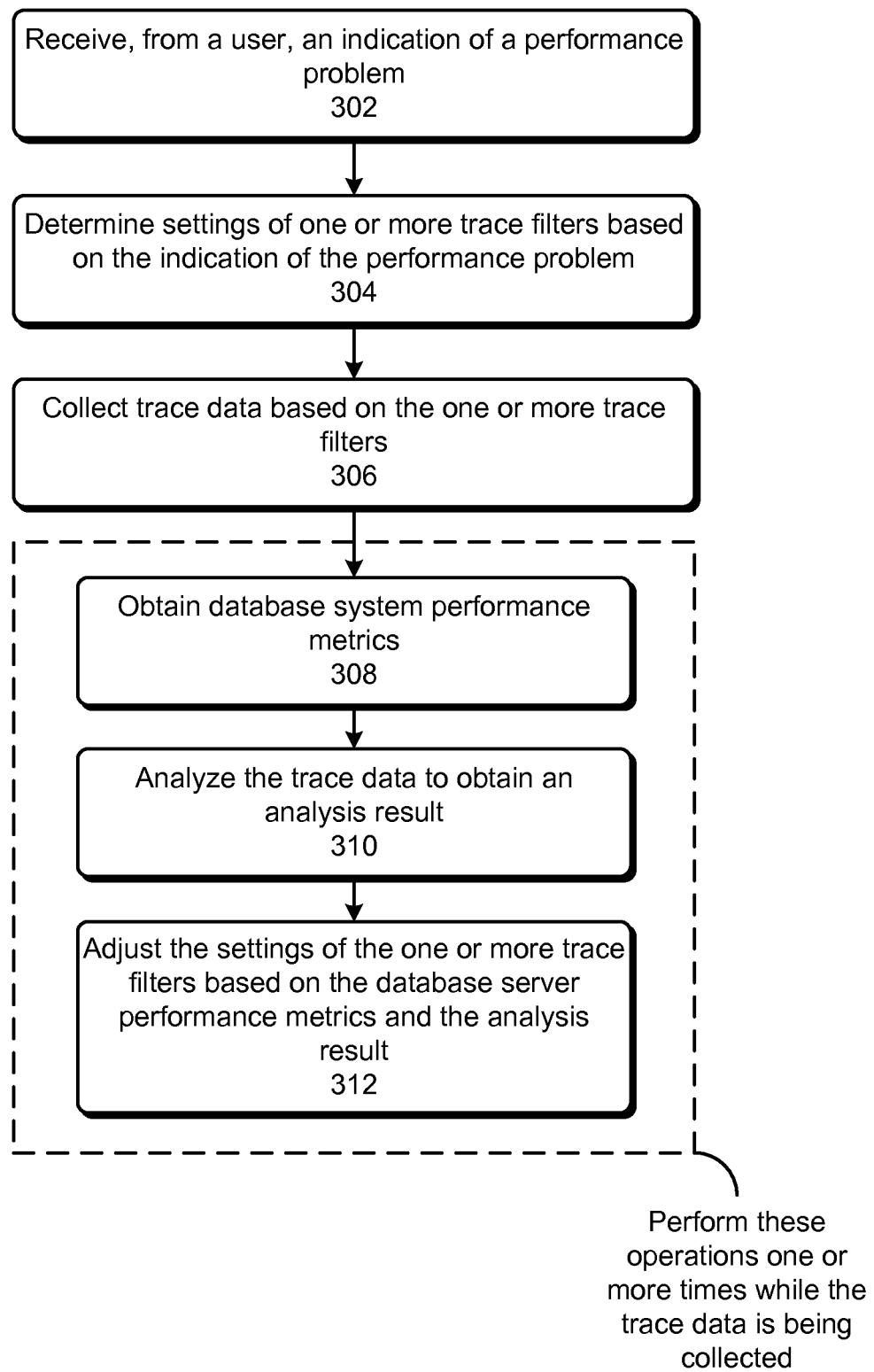
FIG. 3 presents a flowchart that illustrates a process for adjusting the settings of one or more trace filters in accordance with some embodiments described herein.

FIG. 3 presents a flowchart that illustrates a process for adjusting the settings of one or more trace filters in accordance with some embodiments described herein.

The process can begin with a system (e.g., computer 108) receiving, from a user, an indication of a performance problem (operation 302). For example, the user may notice that, on a database system, the utilization of the processor, memory, I/O subsystem, and/or network subsystem is greater than a desirable level. Another example of a performance problem may be that a particular application or a database server instance is processing requests more slowly than a desired speed (e.g., the request processing latency is greater than a threshold).

Specifically, in some embodiments, the system can provide a questionnaire or a list of options to the user that enables the user to identify the type of problem that is being experienced. For example, the system may provide the following three options to the user: (1) a database server is running slowly, (2) an application is performing poorly, and (3) the database is performing poorly (e.g., the user may be experiencing large query processing latencies that involve a particular set of tables in a database). The system may allow the user to select one or more options from this list.

Next, the system can determine settings of one or more trace filters based on the indication of the performance problem (operation 304). Specifically, if the user is presented with a set of performance problems to choose from, then, based on the user's selections, the system can determine an initial set of trace filters. For example, if the user indicates that a database server is running slowly, then the system can configure trace filters to collect trace data for events that are consuming high amounts of processor, memory, I/O, and/or network resources. As an example, the system may collect and store all procedures, batches, and queries whose processor time consumption is greater than a given threshold.

If the user indicates that a particular application is performing poorly, then the system can configure trace filters to collect trace data for any events related to the poorly performing application.

If the user indicates that a database is performing poorly, then the system can configure trace filters to collect trace data for any operations that are performed on the poorly performing database (e.g., the trace filter may collect all procedures, batches, and/or queries that are directed to the poorly performing database).

Once the initial trace filter settings have been determined, the system can start collecting trace data based on the one or more trace filters (operation 306). As mentioned above, it can be very challenging to determine the settings on a trace filter so that the trace filter generates sufficient data for analysis and at the same time does not overwhelm the system. Some embodiments described herein use an adaptive approach to continually adjust the trace filter settings by analyzing the collected trace data and the performance impact on the system.

Specifically, while the system is collecting trace data, the system can perform the following set of operations one or more times: (1) obtain database system performance metrics (operation 308), (2) analyze the trace data to obtain an analysis result (operation 310), and (3) adjust the settings of the one or more trace filters based on the database system performance metrics and the analysis result (operation 312).

In some embodiments, the set of operations can be performed in an iterative fashion, e.g., in a loop. Once the system has collected sufficient data for performing analysis and/or a predetermined amount of time has elapsed, the system can terminate the loop.

The database system performance metrics that are obtained in operation 308 can indicate the performance impact of the collection process on the database system. Specifically, the database system performance metrics can include: (1) an amount of processor time used by a procedure, batch, or query, (2) memory usage of the database system, (3) an amount of disk operations performed while processing a procedure, batch, or query, and/or (4) an amount of bytes or packets processed by a network interface.

For example, before starting the trace collection process, the system may determine values of various performance metrics (e.g., performance metrics related to processor, memory, I/O, network, etc.) during "normal" operation, i.e., when trace collection is not being performed. Then, once trace collection starts, the system can obtain new values for these performance metrics and compare the new values with the "normal" values to determine the performance impact.

In operation 310, the system can analyze the collected trace data to determine whether or not the trace data is sufficient for performing analysis. Depending on the type of the performance problem, a minimum number of data points may be required to perform a proper analysis. Therefore, in operation 310, for each trace filter, the system can analyze the collected trace data to determine whether the amount of trace data being collected by the trace filter is sufficient or whether system needs to collect more trace data by "loosening" the criteria used in the trace filter. On the other hand, if too much trace data is collected, it may overwhelm the subsequent analysis that is performed to determine recommendations for improving performance. Note that the analysis performed in operation 310 is a quick, lightweight analysis to check whether or not sufficient trace data is being collected. Subsequently, a much more detailed analysis may be performed on the collected trace data to determine recommendations to solve the performance problems that were identified in the database system.

In some embodiments, the analysis result determined in operation 310 indicates one of the following: (1) the trace data is insufficient to determine recommendations for solving the performance problem, (2) the trace data is expected to cause performance problems when the trace data is used to determine recommendations for solving the performance problem, or (3) the trace data is sufficient to determine recommendations for solving the performance problem, and is not expected to cause performance problems when the trace data is used to determine recommendations for solving the performance problem.

Once the system obtains the database system performance metrics, and analyzes the trace data, the system can then adjust the trace filters accordingly. If the database system performance metrics indicate that the trace data collection process is having a noticeable performance impact, then the system can reduce the amount of trace data being collected by increasing (or decreasing—depending on the type of trace filter) one or more thresholds. For example, if a trace filter is currently configured to collect and store information of all procedures, batches, and queries that use more than 1 microsecond of processor time, and if the amount of trace data being collected is expected to cause performance problems during post-processing, then the system can adjust the trace filter to collect and store information of all procedures, batches, and queries that use more than 2 microseconds of processor time.

If the analysis of the trace data indicates that the amount of trace data being collected is not sufficient to perform subsequent analysis, then the system can increase the amount of trace data being collected by decreasing (or increasing—depending on the type of trace filter) one or more thresholds. For example, after configuring the trace filter to collect and store information of all procedures, batches, and queries that use more than 2 microseconds of processor time, the system determines that an insufficient amount of trace data is being collected, then the system can adjust the trace filter to collect and store information of all procedures, batches, and queries that use more than 1.5 microseconds of processor time.

If the analysis of the trace data indicates that the trace data is sufficient to determine recommendations for solving the performance problem, and is not expected to cause performance problems when the trace data is used to determine recommendations for solving the performance problem, then the system may decide not to change the trace filter settings. In some embodiments, the system may store these trace filter settings so that they can be used as the initial trace filter settings on future runs.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A method for adjusting trace filters in a database system, the method comprising:

receiving, from a user, an indication of a performance problem in the database system;

determining settings of one or more trace filters based on the indication of the performance problem, wherein the one or more trace filters limit the amount of trace data that is collected for the database system;
collecting trace data for the database system based on the one or more trace filters; and
while the trace data for the database system is being collected, performing the following set of operations:
obtaining database system performance metrics;
analyzing the trace data to obtain an analysis result; and
adjusting the settings of the one or more trace filters based on the database system performance metrics and the analysis result, thereby modifying the amount of trace data that is being collected for the database system.

2. The method of claim 1, wherein the database system performance metrics indicate a performance impact of said collecting.

3. The method of claim 1, wherein database system performance metrics include one or more of:
an amount of processor time used by a procedure, batch, or query;
memory usage of the database system;
an amount of disk operations performed while processing a procedure, batch, or query; and
an amount of bytes or packets processed by a network interface.

4. The method of claim 1, wherein the set of operations is performed continually while the trace data is being collected.

5. The method of claim 1, wherein the analysis result indicates that:
the trace data is insufficient to determine recommendations for solving the performance problem;
the trace data is expected to cause performance problems when the trace data is used to determine recommendations for solving the performance problem; or
the trace data is sufficient to determine recommendations for solving the performance problem, and is not expected to cause performance problems when the trace data is used to determine recommendations for solving the performance problem.

6. The method of claim 1, wherein said adjusting includes modifying a threshold value associated with a trace filter in the one or more trace filters.

7. A non-transitory computer-readable storage medium storing instructions that, when executed by a computer, cause the computer to perform a method for adjusting trace filters in a database system, the method comprising:
receiving, from a user, an indication of a performance problem in the database system;
determining settings of one or more trace filters based on the indication of the performance problem, wherein the one or more trace filters limit the amount of trace data that is collected for the database system;
collecting trace data for the database system based on the one or more trace filters; and
while the trace data for the database system is being collected, performing the following set of operations:
obtaining database system performance metrics;
analyzing the trace data to obtain an analysis result; and
adjusting the settings of the one or more trace filters based on the database system performance metrics and the analysis result, thereby modifying the amount of trace data that is being collected for the database system.

8. The non-transitory computer-readable storage medium of claim 7, wherein the database system performance metrics indicate a performance impact of said collecting.

9. The non-transitory computer-readable storage medium of claim 7, wherein the database system performance metrics include one or more of:
an amount of processor time used by a procedure, batch, or query;
memory usage of the database system;
an amount of disk operations performed while processing a procedure, batch, or query; and
an amount of bytes or packets processed by a network interface.

10. The non-transitory computer-readable storage medium of claim 7, wherein the set of operations is performed continually while the trace data is being collected.

11. The non-transitory computer-readable storage medium of claim 7, wherein the analysis result indicates that:
the trace data is insufficient to determine recommendations for solving the performance problem;
the trace data is expected to cause performance problems when the trace data is used to determine recommendations for solving the performance problem; or
the trace data is sufficient to determine recommendations for solving the performance problem, and is not expected to cause performance problems when the trace data is used to determine recommendations for solving the performance problem.

12. The non-transitory computer-readable storage medium of claim 7, wherein said adjusting includes modifying a threshold value associated with a trace filter in the one or more trace filters.

13. A database system, comprising:
a processor; and
a non-transitory storage medium storing instructions that, when executed by the processor, cause the database system to perform a method for adjusting trace filters, the method comprising:
receiving, from a user, an indication of a performance problem in the database system;
determining settings of one or more trace filters based on the indication of the performance problem, wherein the one or more trace filters limit the amount of trace data that is collected for the database system;
collecting trace data for the database system based on the one or more trace filters; and
while the trace data for the database system is being collected, performing the following set of operations:
obtaining database system performance metrics;
analyzing the trace data to obtain an analysis result; and
adjusting the settings of the one or more trace filters based on the database system performance metrics and the analysis result thereby modifying the amount of trace data that is being collected for the database system.

14. The database system of claim 13, wherein the database system performance metrics indicate a performance impact of said collecting.

15. The database system of claim 13, wherein the database system performance metrics include one or more of:
an amount of processor time used by a procedure, batch, or query;
memory usage of the database system;
an amount of disk operations performed while processing a procedure, batch, or query; and an amount of bytes or packets processed by a network interface.

16. The database system of claim 13, wherein the set of operations is performed continually while the trace data is being collected.

17. The database system of claim 13, wherein the analysis result indicates that:
   the trace data is insufficient to determine recommendations for solving the performance problem;
   the trace data is expected to cause performance problems when the trace data is used to determine recommendations for solving the performance problem; or
   the trace data is sufficient to determine recommendations for solving the performance problem, and is not expected to cause performance problems when the trace data is used to determine recommendations for solving the performance problem.

18. The database system of claim 13, wherein said adjusting includes modifying a threshold value associated with a trace filter in the one or more trace filters.

* * * * *